United States Patent Office 2,959,605
Patented Nov. 8, 1960

2,959,605

PREPARATION OF METAL SALTS

Leonard M. Kebrich, Ridgewood, N.Y., assignor to National Lead Company, New York, N.Y., a corporation of New Jersey No Drawing. Filed Mar. 24, 1958, Ser. No. 723,130

2 Claims. (Cl. 260—436)

This invention relates to a method for the preparation of metal salts. In particular, this invention relates to a method for the preparation of lead acetate trihydrate in stable form.

Lead acetate trihydrate, $Pb(CH_3COO)_2 \cdot 3H_2O$, also called sugar of lead, is a well-known commercial product useful in the manufacture of pigments, driers, phosphors, stabilizers for polyvinyl chloride resins and similar products. It is also employed in the preparation of mordants and as a component of lead plating baths.

The conventional method for preparation of lead acetate trihydrate is by evaporation and crystallization of an aqueous solution of lead monoxide in acetic acid. This method, however, suffered from certain disadvantages. In particular, it was expensive in that it involved the evaporation of substantial amounts of water, which is costly by reason of fuel consumption and also because it involves the use of additional pieces and larger sizes of equipment than would be required if the evaporation were avoided and the batch were all payload instead of largely water.

Moreover, considerable care was required in the preparation of lead acetate trihydrate by this method, especially in the evaporation step. If the evaporation was not carried to completion, as was usually the case, the crystals of lead acetate trihydrate were associated with excess water carried along from the aqueous mother liquor. Removal of this excess water by any commercially-practicable method involved the danger of removing some of the water of hydration along with it, so that it was quite difficult to prepare lead acetate trihydrate of the correct theoretical composition by this method.

On the other hand, if the initial evaporation step was carried too far, there was danger of driving off so much water that not enough was left to form the desired trihydrate. This condition might obtain locally in the viscous syrup, even though there was still a sufficiency of water in the batch as a whole.

An object of this invention, therefore, is to provide an improved and economical method for the production of lead acetate trihydrate. Another object is to provide a method for obtaining a fused mass of lead acetate trihydrate which avoids the necessity of evaporating excess water. Still another object is to provide a method which does not require careful measurement and control during processing. A further object is to provide a method which ensures the production of a uniform product of substantially theoretical composition throughout. Other objects and advantages will become apparent from the following more complete description and claims.

Broadly, this invention contemplates a method for the preparation of lead acetate trihydrate in a massive form, which comprises the steps of heating together an oxide of lead and acetic acid, said lead oxide being present in amounts equivalent to from 1849 to 1859 parts by weight of lead oxide, PbO for each thousand parts by weight of anhydrous acetic acid $CH_3COOH$, and water in amount from 300 to 305 parts by weight for each thousand parts by weight of anhydrous acetic acid, said heating being carried out at a temperature between about 60 and 100° C., and for a length of time sufficient to allow substantially complete reaction.

Lead acetate may be produced, according to this invention, in a system composed of lead monoxide, acetic acid and water in proportions to form the product $Pb(CH_3COO)_2 \cdot 3H_2O$. The process is novel in that at no time is more water present than is required to form lead acetate trihydrate. There is, consequently, no need to evaporate water, and hence no danger of leaving excess water associated with the product, or of evaporating too much water so that the product is deficient in water of crystallization.

In addition, the active ingredients react while the batch is in a molten form thus resulting in the formation of exothermic heat and a consequent substantial fuel saving in the amount of fuel needed to maintain the batch in molten form.

The oxide of lead used as a starting material in the process of this invention may be any commercial type of lead monoxide, including either or both of the orthorhombic and tetragonal crystal modifications. Oxides containing a maximum content of the yellow orthorhombic variety are preferred, merely for reasons of convenience and economy. Hydrated lead oxides, lead carbonates or similar products may be employed on a mol for mol basis instead of the lead oxide if so desired.

For convenience in operation, it is preferred to employ glacial acetic acid and to add the required water separately. It is also possible, however, to mix the acetic acid and water before adding them to the litharge or, if desired, to employ acetic acid of lower concentration to begin with, providing the acid used is not so dilute that excessive amounts of water are introduced into the reaction mixture with it.

The ratio of lead monoxide to acetic acid is important. If less than about 1849 parts of lead monoxide are present for each thousand parts of anhydrous acetic acid by weight, the product will contain excess acetic acid which is undesirable from the point of view of handling and packaging, and represents unnecessary waste of chemical values. If, on the other hand, the amount of lead monoxide exceeds about 1859 parts of each thousand parts of acetic acid, the product will contain the excess lead oxide in the form of a basic lead aceate, and thus be of erroneous composition. It may be noted that 1859 parts of lead monoxide for each thousand parts of acetic acid is the theoretical ratio. If this ratio is departed from, it should be in the direction of a small excess of acetic acid, to offset any small loss by volatilization during the reaction.

The amount of water added is also important. If there is less than about 16.6 parts of total water in the system for each part of anhydrous lead acetate theoretically formed by the amount of lead oxide and acetic acid used, the product will be partly or wholly lead acetate hemihydrate or even anhydrous lead acetate, instead of the desired trihydrated product.

If the total amount of water exceeds about 16.6 parts of water for each part of anhydrous lead acetate theoretically formed, the product will contain the excess water in the free state, thus creating difficulty in handling and packaging of the product.

Part of the necessary water is supplied by the neutralization reaction; the remainder must be supplied, either as such or in association with the lead oxide or the acetic acid. The amount of water so added should be between about 0.300 and 0.303 part for each part of acetic acid used, in order to give the proper amount of total water in the system. Preferably, the amount of water should be about 0.300 part for each part of acetic acid, corresponding to the theoretical amount required to form lead acetate trihydrate.

Ordinarily, the most convenient method of supplying the required water is by adding it directly to the batch. However, it may be first mixed with the acetic acid and, if desired, part of it may be introduced with lead, as where the lead compound used is lead hydroxide, $Pb(OH)_2$ instead of lead monoxide, PbO. Neutralization of lead monoxide with acetic acid liberates one mol of water according to the equation:

$$PbO + 2CH_3COOH \rightarrow Pb(CHCOO)_2 + H_2O$$

Neutralization of lead hydroxide, on the other hand, liberates two mols of water, according to the equation:

$$Pb(OH_2) + 2CH_3COOH \rightarrow Pb(CH_3COO)_2 + 2H_2O$$

The second mol of water thus introduced by the use of lead hydroxide should be accounted for in computing the amount of additional water required to form lead acetate trihydrate, $Pb(CH_3COO)_2 \cdot 3H_2O$.

Example 431 lbs. glacial acetic acid and 129.5 lbs. water were mixed in a 100 gal. reaction vessel. The solution was stirred at room temperature and treated at a uniform rate over a 41-minute interval with 801 lbs. litharge. Exothermic heat raised the temperature of the batch to 67° C. The melt was stirred for an additional 41 minutes while being heated to 80° C. The clear molten product was then pumped into trays to solidify. Lead content of the product was 54.5%. Calculated lead content of acetate trihydrate is 55.63%.

The massive lead acetate trihydrate product made according to the process of this invention is useful as an article of commerce in the same ways as the granular lead acetate trihydrate heretofore supplied, for example in pigment or chemical manufacture or in other industrial applications in which lead acetate is employed.

The massive lead acetate trihydrate of this invention also provides a most convenient starting material for the preparation of anhydrous lead acetate. In order to prepare the anhydrous lead acetate, it is necessary only to dry the trihydrate at a temperature between about 30 and 50° C., preferably after grinding to increase the speed of the reaction. It should be noted that when using the massive product of this invention, it is possible to grind and dry in consecutive or simultaneous operations, whereas, if the granular "lead acetate trihydrate" heretofore available is used, it is necessarily stored in the granular form and has had opportunity to effloresce and to absorb carbon dioxide from the atmosphere, so that the resulting anhydrous product is contaminated with lead carbonate.

The process of this invention is simple, inexpensive and easy to carry out, and may be performed in conventional equipment by persons without special training for the purpose.

While this invention has been described in terms of certain embodiments and illustrated by means of specific examples, these are illustrative only, and the invention is not to be construed as limited, except as set forth in the appended claims.

I claim:

1. A method for the preparation of lead acetate trihydrate in massive form, which comprises the steps of heating together an oxide of lead and liquid acetic acid, said lead oxide being present in amount equivalent to from 1.849 to 1.859 parts by weight of lead monoxide for each part by weight of acetic acid, $CH_3COOH$, and water in amount from 0.300 to 0.303 part by weight for each part of acetic acid, said heating being carried out at a temperature between 60 and 100° C., and for a length of time sufficient to allow substantially complete reaction.

2. A method for the preparation of lead acetate trihydrate according to claim 1, which includes the steps of forming a molten mass corresponding in composition to $Pb(CH_3COO)_2 \cdot 3H_2O$.

References Cited in the file of this patent

UNITED STATES PATENTS

| | | |
|---|---|---|
| 861,345 | Wultze | July 30, 1907 |
| 1,842,908 | Lawrence | Jan. 26, 1932 |

FOREIGN PATENTS

| | | |
|---|---|---|
| 8,025 | Great Britain | 1839 |
| 9,858 | Great Britain | 1888 |